(12) United States Patent
Cajigas Bringas et al.

(10) Patent No.: US 8,412,156 B2
(45) Date of Patent: Apr. 2, 2013

(54) MANAGING AUTOMATIC LOG IN TO INTERNET TARGET RESOURCES

(75) Inventors: Guillermo Cajigas Bringas, Madrid (ES); Miguel Angel Touset Rios, Madrid (ES); Juan Jose Valverde Fuster, Madrid (ES); Miquel Oliver Riera, Barcelona (ES); Johan Zuidweg, Barcelona (ES)

(73) Assignees: Vodafone Group PLC, Newbury Berkshire (GB); i2Cat, Barcelona (ES)

( * ) Notice: Subject to any disclaimer, the term of this patent is extended or adjusted under 35 U.S.C. 154(b) by 0 days.

(21) Appl. No.: 13/074,961

(22) Filed: Mar. 29, 2011

(65) Prior Publication Data

US 2011/0287739 A1 Nov. 24, 2011

(30) Foreign Application Priority Data

Mar. 29, 2010 (ES) .................................. 201030471

(51) Int. Cl.
*H04M 1/66* (2006.01)
(52) U.S. Cl. ........................................ 455/410; 713/168
(58) Field of Classification Search .................. 455/405, 455/433, 410; 713/159, 169, 155, 185, 168; 235/380, 382.5, 375, 382; 715/978
See application file for complete search history.

(56) References Cited

U.S. PATENT DOCUMENTS

| 6,233,577 | B1 * | 5/2001 | Ramasubramani et al. ........... 1/1 |
| 6,859,878 | B1 * | 2/2005 | Kerr et al. ..................... 713/183 |
| 6,865,680 | B1 * | 3/2005 | Wu et al. .......................... 726/12 |
| 7,360,087 | B2 * | 4/2008 | Jorgensen et al. ............. 713/168 |
| 2003/0084143 | A1 * | 5/2003 | Knoesel et al. ............... 709/224 |

FOREIGN PATENT DOCUMENTS

EP 1919156 A1 * 5/2008
GB 2424807 10/2006

OTHER PUBLICATIONS

Thanh et al., "Offering SIM Strong Authentication to Internet Services," Whitepaper rev. 2.3, published by StrongSim at www.strongsim.org, Oct. 2006.

* cited by examiner

*Primary Examiner* — Mahendra Patel
(74) *Attorney, Agent, or Firm* — Workman Nydegger

(57) ABSTRACT

A system and a method for managing automatic log in to Internet target resources are disclosed. The system comprises a mobile phone with a storing device to store private identities and a computer with a client browser and a browser plug-in. The browser plug-in is configured to, upon receiving information containing a login form from a target resource being accessed: request a user identifier; and send an identity request to an identification server. Furthermore, the identification server is configured to obtain a phone number associated to the user identifier and send an identity message to the phone. The phone is provided with a client application which looks up the private identities associated to the target resource and sends the selected private identity to the identification server and then to the client browser to log in to the target resource using the selected private identity.

28 Claims, 10 Drawing Sheets

MANAGING AUTOMATIC LOG IN TO INTERNET TARGET RESOURCES

CROSS-REFERENCE TO RELATED APPLICATION

This application claims priority to and the benefit of Spanish Patent Application No. ES P201030471, filed on Mar. 29, 2010, which is hereby incorporated by reference in its entirety.

FIELD

Embodiments of the present invention are directed to the field of information technology, and more specifically to the automatic access of Internet web sites requiring login.

BACKGROUND

One of the important frustrations of Internet users today is the need to manage different Internet identities for different online services, which in practice means remembering many different usernames, passwords and pin codes. The increasing number of applications and services available from both fixed and mobile devices demands a solution to manage all this sensitive information.

There are identity solutions and frameworks that deal with Identity exchange in Internet as OpenID, CardSpace, .NET Passport, Sibboleth and Liberty Alliance tools. All of these can only be used with web sites and online services that are compatible with these systems. They are complex tools which are described below in detail, and are not designed to use with a mobile handset.

There are two approaches to improving Internet identity management: single sign on (SSO) systems and identity meta-systems.

A single sign on system provides users with a single Internet identity that offers access to multiple web sites and online services. An identity meta-system lets a user manage his multiple existing Internet identities, and select the appropriate identity according to the web site or service requested. Shibboleth, OpenID, Liberty and .NET Password are single sign on systems, whereas Windows CardSpace is an identity meta-system.

Shibboleth is an open-source single sign on system based on the Security Assertion Markup Language (SAML), a standard which describes an XML format and protocol for exchanging authentication and authorization assertions between servers. FIG. 1 shows how Shibboleth works, the Shibboleth information flow.

The Shibboleth sign-in procedure consists of the following steps:

S1. The user accesses a protected resource (called the Service Provider), and requests a web page.
S2. The Service Provider redirects the user to the Where Are You From (WAYF) service, so that he can select his home organisation (called the Identity Provider).
S3. The WAYF service redirects the user to his Identity Provider.
S4. The user authenticates himself, by whatever authentication procedure his Identity Provider requires.
S5. After successful authentication, the Identity Provider generates a one-time handle or session identifier for this session, and redirects the user to the Service Provider.
S6. The resource can use the handle to request attribute information for this user from the Identity Provider (optional).
S7. The Identity Provider provides or denies the requested attribute information.
S8. Based on the authentication information and attribute information made available, the Service Provider gives or denies the user access to the requested resource.

At present, Shibboleth is mostly used among academic institutions and research centres. Note that in Shibboleth, a user has to belong to an organisation which can assert his identity. One of the features of Shibboleth is that it allows stronger or weaker authentication, depending on the attributes exchanged between Service Provider and Identity Provider.

OpenID is a single sign on system that allows internet users to access websites with one single "OpenID", OpenID is an open distributed system the use of which is free of charge. In principle any user or organization can become an OpenID Provider, and a user can choose any OpenID Provider that suits his or her needs. In fact, a user can very easily change OpenID Providers without loosing his or her OpenID.

FIG. 2 shows how OpenID works. The OpenID sign-in procedure consists of the following steps:

S1'. The user accesses an OpenID enabled website (called the Consumer in OpenID terminology), and the site provides a form requesting the user's OpenID identity.
S2'. The user enters his OpenID, for example johan.vodafone-id.com and submits the form to the OpenID Consumer.
S3'. The OpenID Consumer converts the OpenID (e.g. johan.vodafone-id.com) to the URI normal form (e.g. http://johan.vodafone-id.com) and does a HTTP GET to this URI.
S4'. The site returns a HTML document from which the Consumer can derive the location of the OpenID Provider (note that in this example they are the same).
S5'. The Consumer sends a HTTP POST to the OpenID Provider with an associate request. This establishes a shared secret between the Provider and Consumer, using the Diffie-Hellman algorithm.
S6'. The OpenID Provider returns an association handle (with a set expiration date and time) for use in future requests.
S7'. The OpenID Consumer now redirects the user to the OpenID Provider for login.
S8'. The user authenticates his identity with the OpenID Provider.
S9'. The OpenID Provider redirects the user back to the Consumer website, providing the necessary authentication verification in a querystring.

Although the OpenID information flow resembles that of Shibboleth, there are two important differences:
In OpenID, the user asserts his own identity while in Shibboleth, it is the user's organization (the Identity Provider) that "owns" the user's identity.
Open IDs are persistent and independent of the OpenID Provider a user chooses to register with. In Shibboleth, a user's identity is linked to his organization (acting as Identity Provider).

This means that OpenID has certain advantages in terms of openness and universality. Although the use of single sign on in Internet is not yet widespread, it appears as though OpenID is quickly gaining acceptance. Some sites that accept OpenID, or will do so in the near future, include AOL, Yahoo, Flickr, Blogger, Orange, Sun, Novell, and Oxfam.

Critics argue that the current implementation of OpenID has security flaws. OpenID does offer protection from identity spoofing and man-in-the-middle attacks, since the query string used for logging a user into the Consumer website is signed with the shared secret between Consumer and Provider. However, it remains possible for a malignant Consumer to spoof OpenID provider's authentication pages, and thus obtain a user's OpenID password and credentials.

The user can protect himself against this type of attacks by registering with secure OpenID provider which uses trustworthy certificates to accredit its identity. Unfortunately however, the average user is generally not aware of how certificates work and how to trust (or mistrust) them.

Liberty Alliance is a complete identity management framework that offers not only single sign on but also single signout, identity federation and web services specifications for building interoperable identity applications. Like Shibboleth and OpenID, the Liberty protocols are also based on SAML.

As FIG. 3 shows, the Liberty single sign on procedure is similar to that of Shibboleth and OpenID. The Liberty sign-in procedure consists of the following steps:

S1*. The user accesses the web site of a Service Provider that is Liberty enabled.

S2*. The Service Provider determines the user's Identity Provider from the HTTP request.

S3* and S4*. The Service Provider redirects the user to the Identity Provider. The Identity Provider authenticates the user.

S6* and S7*. The Identity Provider redirects the user to the Service Provider with the assertion of his or her identity.

S8* and S9*. The Service Provider and Identity Provider exchange handles.

S10*. The Service Provider asserts the process.

S11*. The Service Provider provides access to the user.

Liberty Alliance is a large scale industry initiative dating back to 1999. Liberty Alliance members include IT and telecommunications vendors, banks and credit card companies, and telecommunications operators. Vodafone, France Télécom and NTT DoCoMo are Liberty Alliance members, among many others.

In spite of its wide industry and political backing, Liberty use is still not widespread on the Internet. Liberty appears to be accepted mostly by large organizations and governmental bodies, but has not penetrated into mid-size and smaller online services, which make up most of the Internet today. Critics of Liberty Alliance argue that this is due to the complexity of the Liberty architecture and federation mechanisms. While Liberty does provide a complete framework for identity management, this appears to be overkill for most "common" websites wishing to offer single sign on.

".NET Passport" is Microsoft's single sign on system. NET Passport issues the user with a "Windows Live Id" which can be used in all Microsoft services as well as on some other sites. Like OpenID, .NET Passport only authenticates user identities, it does not authorize user access to web pages.

At present, .NET Passport and Windows Live Ids appear to be used mostly for Microsoft related services. Though some other web sites offer .NET Passport based authentication, the use of Windows Live Id is not widespread beyond Microsoft web sites and online services.

The way .NET Passport works is similar to how OpenID works, as illustrated in FIG. 4: when the user signs into a page that is Passport enabled, his browser is redirected to a .NET Passport site which will authenticate the user. If the user successfully authenticates, the .NET Passport site sends the authentication information back to the user's browser in the form of an encrypted query string and cookies; the user's browser then forwards this information to the original site for authorization. As show in FIG. 4, the .NET Passport procedure consists of the following steps:

S1". User's browser sends initial page request to the participating site.

S2". Redirect for authentication.

S3". User's browser send a request for sign-in page to the passport site.

S4". The user's browser obtains the sign-in page from the passport site.

S5". Send user credentials to the passport site.

S6". Update passport.com cookies of the user's browser and redirect to the participating site.

S7". Send encrypted authentication query string to the participating site.

S8". The user's browser receives site cookies and requested page from the participating site.

.NET Password differs from OpenID in the way that handles to the requested page are managed. In .NET there is mostly one identity provider (Microsoft), so that it is unnecessary to establish a shared secret and associate handles as part of the sign-in flow. In .NET Passport all communication goes through the user's browser.

But the most important difference lies in the fact that OpenID is an open system that supports distributed identity management, whereas Windows Live Ids are principally managed by Microsoft.

Most identity meta-systems, and most notably Windows CardSpace, are based on variations of the info card concept. An info card is a container for an Internet user's identity, issued by a trusted party, which can be presented to a web site or online service that requests authentication. It is graphically represented on the user's computer as an Identity card. An info card can be configured by the user himself, but it can also provide a digital certificate issued by one of the trusted parties he or she has a relationship with.

Note that the info card only serves as an identity selector, it is not a single sign on system like OpenID, Liberty or .NET Passport in itself.

The present invention solves the commented problems on the above systems by providing a system and method which enables the use of a mobile handset to easily log-in in Internet website and not to remember a lot of username-password tuples. The objective of the present system, Dial Your Identity (DYI onwards), is to allow users to manage and use the identities they need in their regular navigation in the Internet with their mobile phones extending the use of the mobile phone to provide services beyond basic communications. Therefore, the system proposed in the present invention provides a user a simple way of managing and using his Internet Identities (username-password pairs) using their mobile handset, offering a very easy way to log-in Internet web sites.

BRIEF SUMMARY

Embodiments of the present invention are directed to systems for managing automatic log in to Internet target resources and to corresponding methods.

An example system comprises a mobile phone, provided with a storing device in which user private identities are stored, an identification server, and a computer provided with a client browser with a browser plug-in. The browser plug-in is configured, upon reception of information containing a login form sent by a target resource which a user of the client browser is accessing, to: detect the login form contained in the information received; request from the user, and accordingly obtain, a user identifier; and send an identity request addressed to reach the identification server, said identity request including at least the user identifier. The identification server is configured, upon reception of the user identifier, to: obtain a mobile phone number associated to said user identifier; and send an identity message addressed to the mobile phone, the identity message containing an identifier of the target resource. The mobile phone is provided with a client application configured to, upon reception of an identity message, look up the user private identities associated to the target resource in the storing device; if at least one associated user private identity is found, request the mobile phone user confirmation for automatic logging in to the target resource using a user private identity selected from said at least one associated user private identity; and if there is confirmation for automatic logging, send said confirmation and the selected user private identity to the identification server. The identification server is further configured, if confirmation for automatic logging is received, to send the selected user private identity to the client browser. The browser plug-in is further configured to, upon reception of the selected user private identity, log in to the target resource using said selected user private identity.

In another embodiment the identity request further includes an identifier of the target resource being accessed, and the browser plug-in is configured to send the identity request directly to the identification server.

The target resource can be OpenID enabled. In that case the browser plug-in may be configured to send the identity request addressed to reach the identification server through the target resource.

The client application can be further configured to, in case a plurality of user private identities associated to the target resource are found, request the user to select one user private identity to be sent to the identification server.

The client application may be associated to at least one port of the mobile phone, and the mobile phone can be configured to, upon reception of an identity message received on a predetermined port associated to the client application, run the client application, if not running yet.

Each communication originating from the identification server and addressed to the mobile phone may be carried out through the sending of at least one SMS message.

In another embodiment the mobile phone has wireless Internet access capability and each communication originating from the mobile phone and addressed to the identification server is carried out through the sending of at least one HTTP message.

Each communication between the computer and the identification server, in both directions, may be carried out through at least one HTTP message.

According to another aspect of the present invention there is provided a method for managing automatic log in to Internet target resources, when a computer provided with a client browser accesses a target resource that requires login. An example method comprises: detecting, upon reception of information containing a login form sent by the target resource which a user of the client browser is accessing, the login form contained in the information received; requesting the user, and accordingly obtain, a user identifier; sending an identity request addressed to reach an identification server, said identity request including at least the user identifier; obtaining, upon reception of the user identifier, a mobile phone number associated to said user identifier; sending an identity message addressed to the mobile phone with said mobile phone number, the identity message containing an identifier of the target resource; looking up, upon reception of the identity message, the user private identities associated to the target resource in a storing device of the mobile phone; if at least one associated user private identity is found, requesting the mobile phone user confirmation for automatic logging in to the target resource using a user private identity selected from said at least one associated user private identity; if there is confirmation for automatic logging, sending said confirmation and the selected user private identity to the identification server; if the identification server receives confirmation for automatic logging, sending the selected user private identity to the client browser; and logging in, upon reception of the selected user private identity, to the target resource using said selected user private identity.

The method can further comprise, in case a plurality of user private identities associated to the target resource are found, requesting the user to select one user private identity to be sent to the identification server.

BRIEF DESCRIPTION OF THE DRAWINGS

A series of drawings which aid in better understanding the invention and which are expressly related with an embodiment of said invention, presented as a non-limiting example thereof, are very briefly described below.

FIGS. 7 and 8 show the automatic login flow carried out by the browser plug-in.

DETAILED DESCRIPTION OF EXAMPLE EMBODIMENTS

Figure 1:
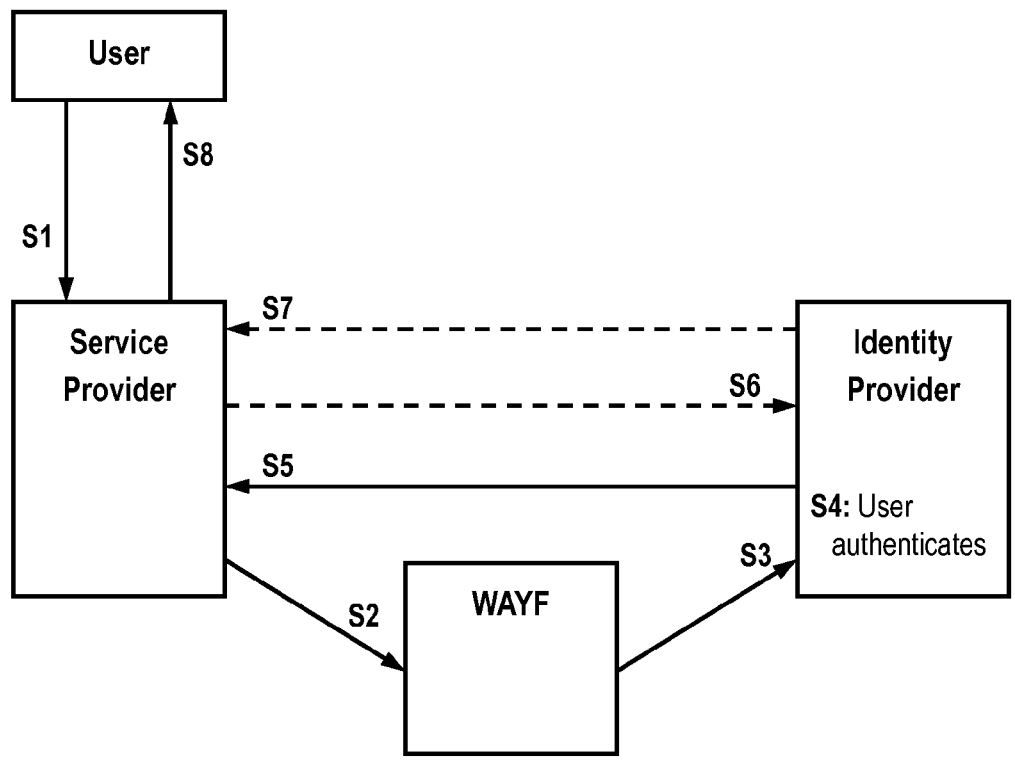
FIG. 1 shows the information flow of the Shibboleth sign on system, according to the prior art.
Figure 2:
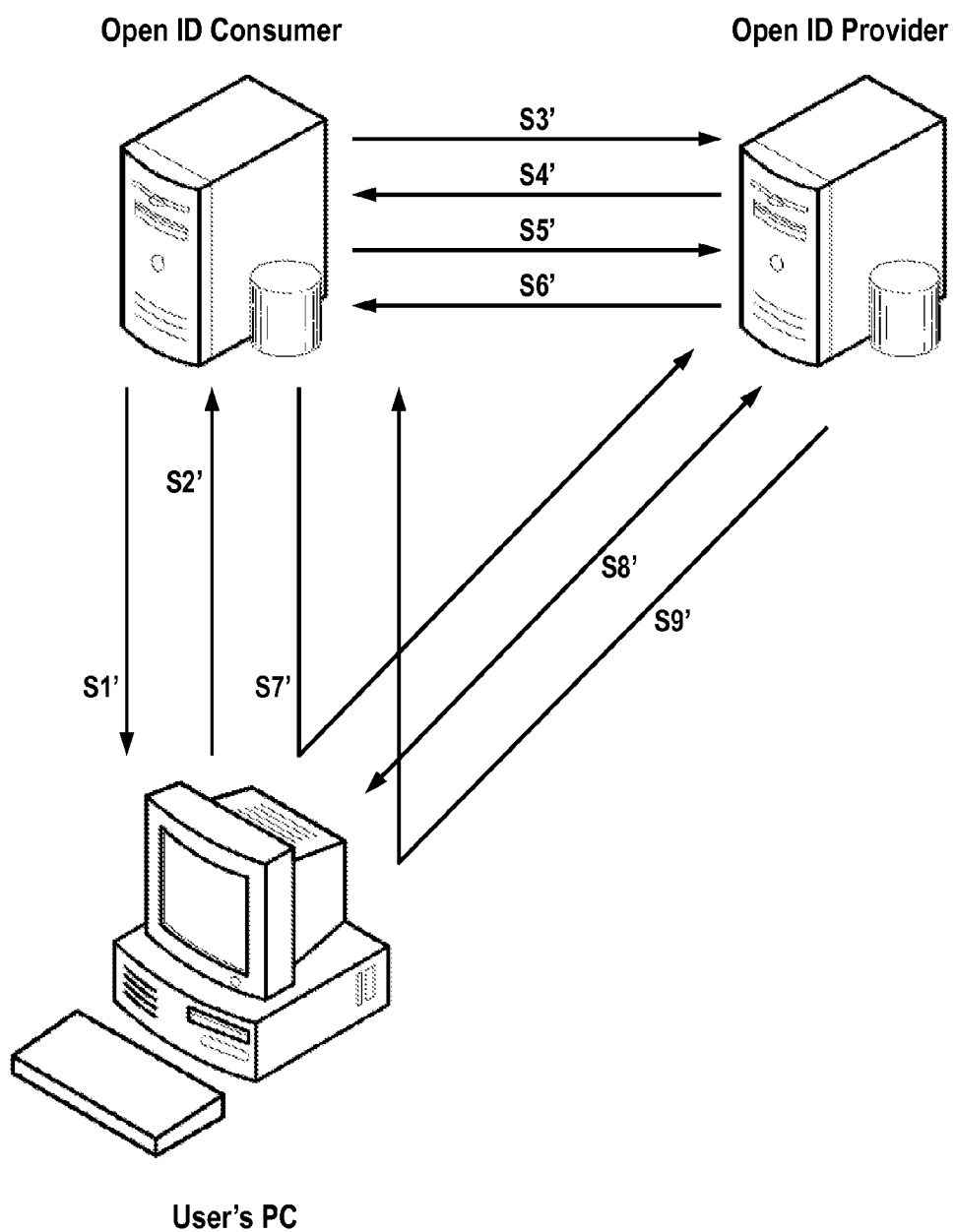
FIG. 2 shows the information flow of the OpenID sign on system, according to the prior art.
Figure 3:
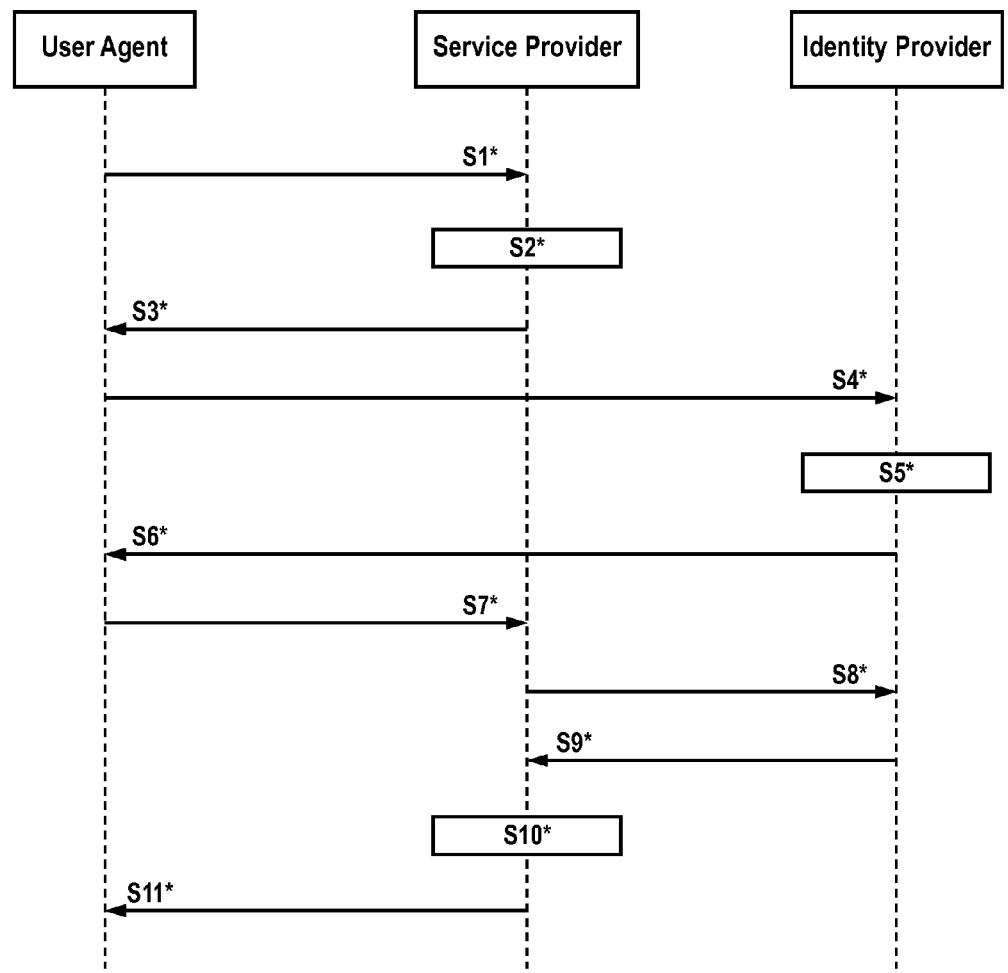
FIG. 3 shows the information flow of the Liberty sign on system, according to the prior art.
Figure 4:
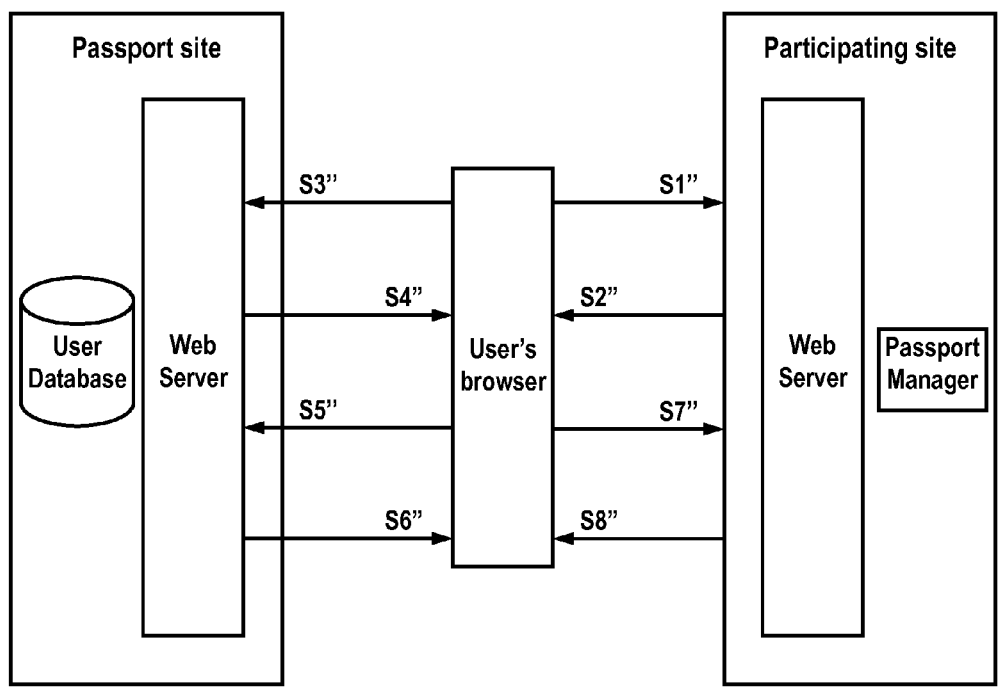
FIG. 4 shows the authentication procedure of the .NET Passport sign on system, according to the prior art.
Figure 5:
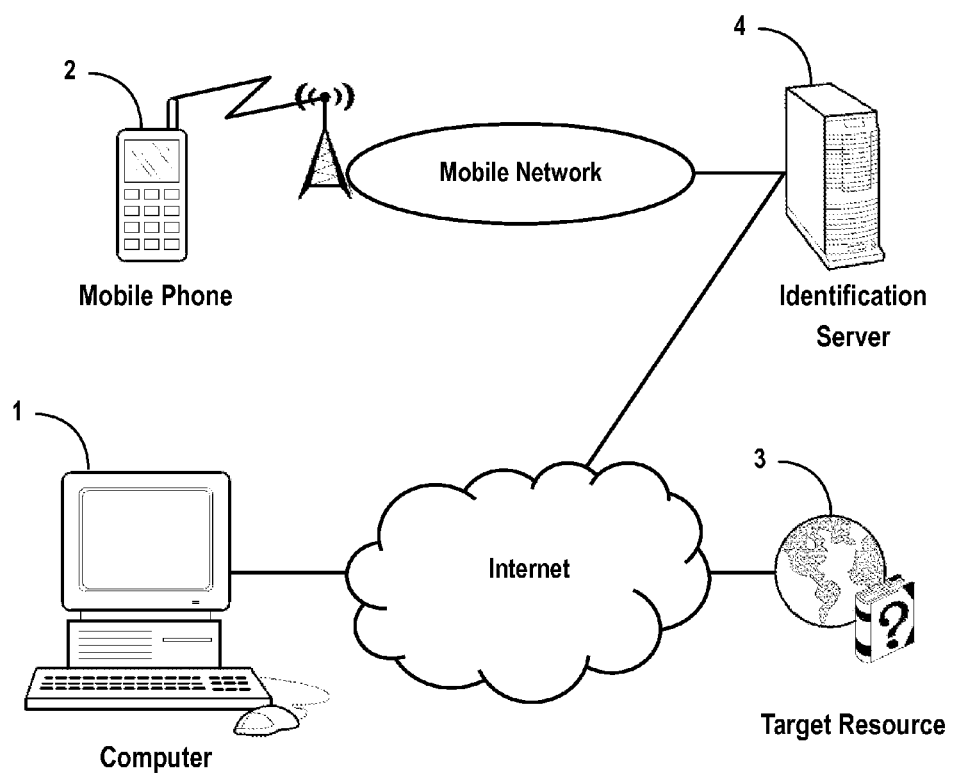
FIG. 5 schematically represents the system according to the present invention.

In accordance with one aspect of the present invention, there is provided a system for managing different user's private identities for Internet services, called from now on DYI (Dial Your Identity) system. The system comprises the following components, as illustrated in FIG. 5:

A computer 1 (normally a client computer): a host on the Internet with the capacity to act as HTTP client. The user should ideally be able to use DYI from any host in the Internet, including shared PCs in Internet cafés, public WiFi areas, etc. These hosts are assumed to have non trusted connections to the Internet.

A mobile phone 2: the user's mobile phone with a SIM (Subscriber Identification Module) card. Any electronic terminal provided with a SIM or U/SIM card and with connection to the mobile network is considered as a mobile phone throughout the present description. There are no restrictions on the phone other than that it must be able to run the client application 20 depicted in FIG. 6 (e.g. J2ME-Java-applications), and that it must be able to connect to Internet. The requirement on the mobile phone is that it could execute some sort of software that can be downloaded to it, so the mobile phone should have minimal openness functionalities in order to execute external software. Most mobile phones presently have Mobile Internet Device (MID) platform facilities that support J2ME applications.

Identification server 4: a server or cluster that implements the network side of the DYI application.

The system interacts with a target resource 3, which is any HTTP target resource on the Internet for which authentication is required, typically a web site that requires login.

Although FIG. 5 shows the identification server 4 as a single component, it could certainly be splitted into several physical systems. The system as a whole hosts multiple functionalities:

- HTTP server: It hosts a system for the user to manage (upload, edit delete, etc.) its identity. In the present case login/password pairs used by the user in his regular accesses to Internet services. The system does not store them.
- It Implements the DYI server side logic—the network side logic—.
- Application server: The system allows for the user to download client software needed for the phone and for the Internet browser.
- HTTP proxy: in one of the scenarios considered, the identification server also acts as a HTTP proxy.

Figure 6:
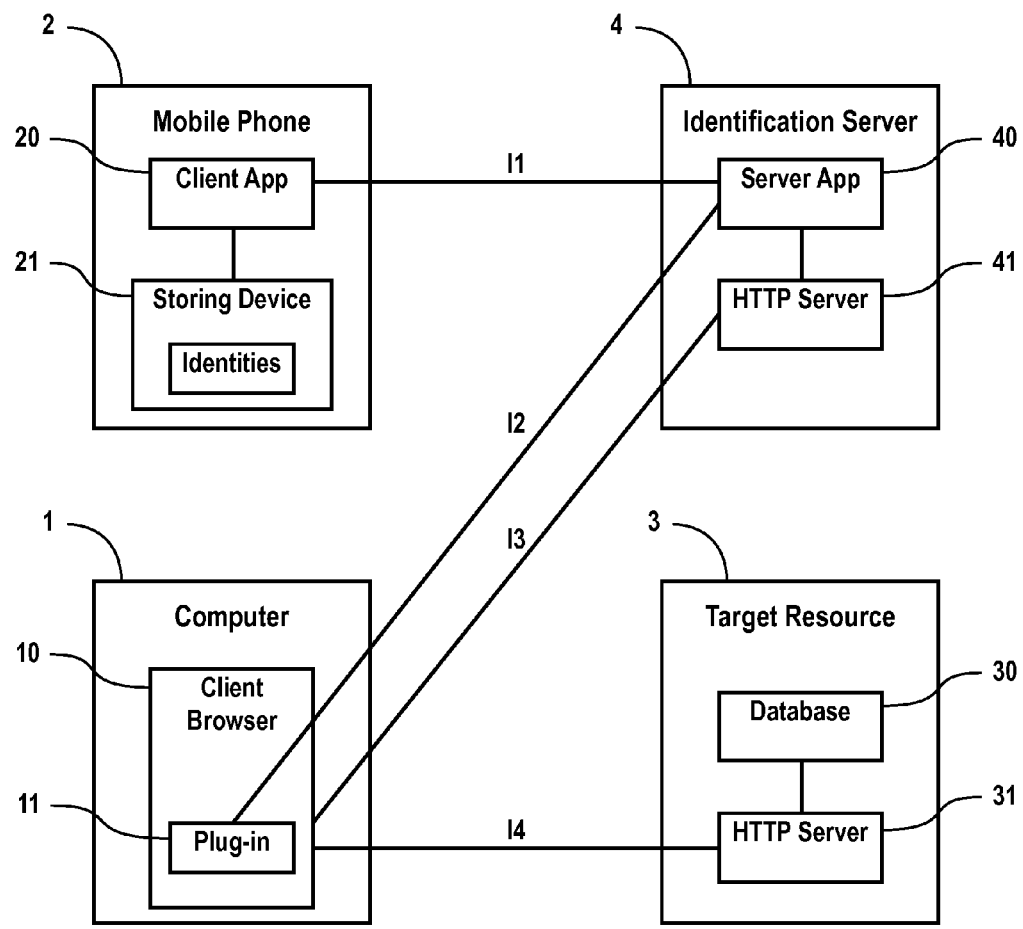
FIG. 6 schematically shows the logical components of the system.

The overall architecture of a preferred embodiment of the system is illustrated in FIG. 6 and has the following logical components:

- The mobile phone 2 contains a client application 20, which accesses the user identities stored in the storing device 21 (e.g. in the SIM card). The user will have to install the client application 20 (normally previously downloaded from the mobile network operator) prior to using the DYI system. Such download is simple, and consists of no more than downloading and installing files (e.g., .jar/.jad files) over the air from a public URL, via WAP push or from a personal computer. Of course, this does require that the client mobile phone has the capacity to run Java applications (more than 80% of mobile phones presently available support Java Applications).
- The computer 1 contains a standard HTTP client browser 10 with an extension or browser plug-in 11 that retrieves the user identities and performs automatic log in to target resources 3. The user will have to download and install the browser plug-in 11 prior to using the DYI system. Such a download procedure is very simple however, and identical to the download and installation of other plug-ins (for example a Flash player or toolbar).
- The identification server 4 contains a HTTP server 41 that handles identity management requests and a server application 40. The server application has two main functions: to retrieve user identities from a user's mobile phone when automatic login is required and to manage user identities online through HTTP.
- The target resource 3, which is not part of the system, comprises an HTTP server 31 and a database 30 with personalized information for which authentication is required (e.g. Facebook, blog, email, bank account information).

FIG. 6 also shows the interfaces between the logical components:

- I1: the interface, in the mobile network, between the client application 20 and the server application 40.
- I2: the interface between the browser plug-in 11 and the server application 40, which uses standard TCP/IP transport over public Internet.
- I3: the interface between the client browser 10 and HTTP server 41.
- I4: the interface between the client browser 10 and target resource 3.

Interfaces I2, I3, and I4 use standard TCP/IP transport over the public Internet. These interfaces carry standard HTTP requests and responses.

Interface I1 is the most complex interface of the system. Messages from the server application running in the identification server 4 to the client application 20 in the mobile phone are transported over SMS, while messages in the opposite direction are preferably transported over TCP/IP over the air (GPRS). This mechanism is similar to how WAP Push works. It is necessary to implement this interface in this way, because the mobile phone can only act as HTTP client and cannot serve HTTP requests. SMS are not only a text mechanism among mobile phone but also a de facto, alerting asynchronous mechanism that all mobile handsets accepts.

The DYI system has two modes of operation:

1. Identity management system: enabling the user to log in automatically to any web site using his existing Internet identities, using the mobile phone as identity selection and management device.

2. Single sign on system: enabling the user to log in to OpenID enabled web sites using his OpenID, whereby the identification server of the mobile network operator acts as identity provider and the mobile phone is used as authentication device. The present invention can also work using other single sing-on systems, such as .NET Passport, Sibboleth and Liberty.

1. Identity Management System

The information flows between the architecture components in case the DYI service operates as an identity management system is as follows (flow for identity selection and automatic login).

The browser plug-in 11 on the computer 1 automatically detects login pages, retrieves the relevant user identity from the user's mobile phone, and then automatically logs the user into the target resource.

This procedure is similar to how standard browsers such as Windows Explorer and Firefox actually remember user names and passwords and automatically use them to log in a user. The main difference is that in the case of the DYI system, the user's identities are stored in the user's mobile phone and not in the browser or plug-in (the later adds mobility and eliminates access restriction as Firefox® and Windows Explorer® only retrieve the password that resides in the very computer they are using only).

Figure 7:
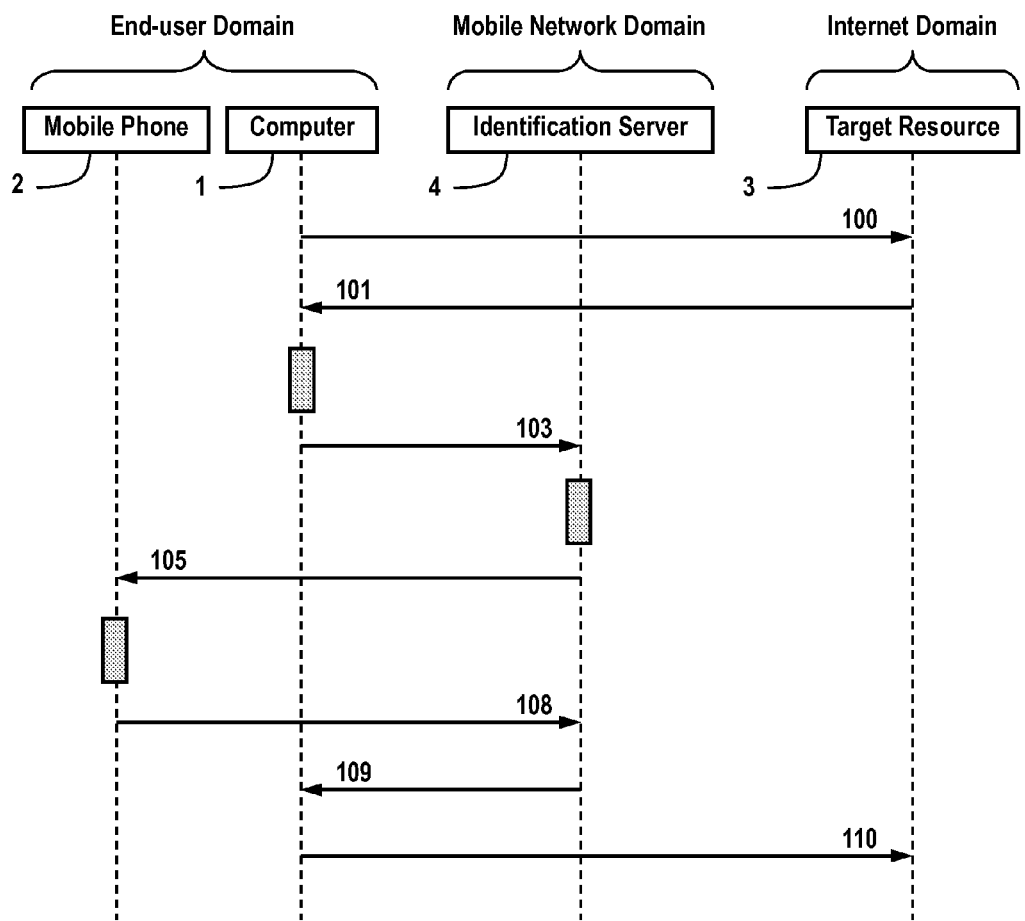

FIG. 7 shows the proposed flow:

From the computer 1, the end-user requests 100 (for instance, via "HTTP GET target resource") connection to (or information from) a target resource 3 that requires login. The target resource 3 returns 101 a login form (for instance, via "200 OK [login page]"). This is a standard HTTP request-reply.

Figure 8:
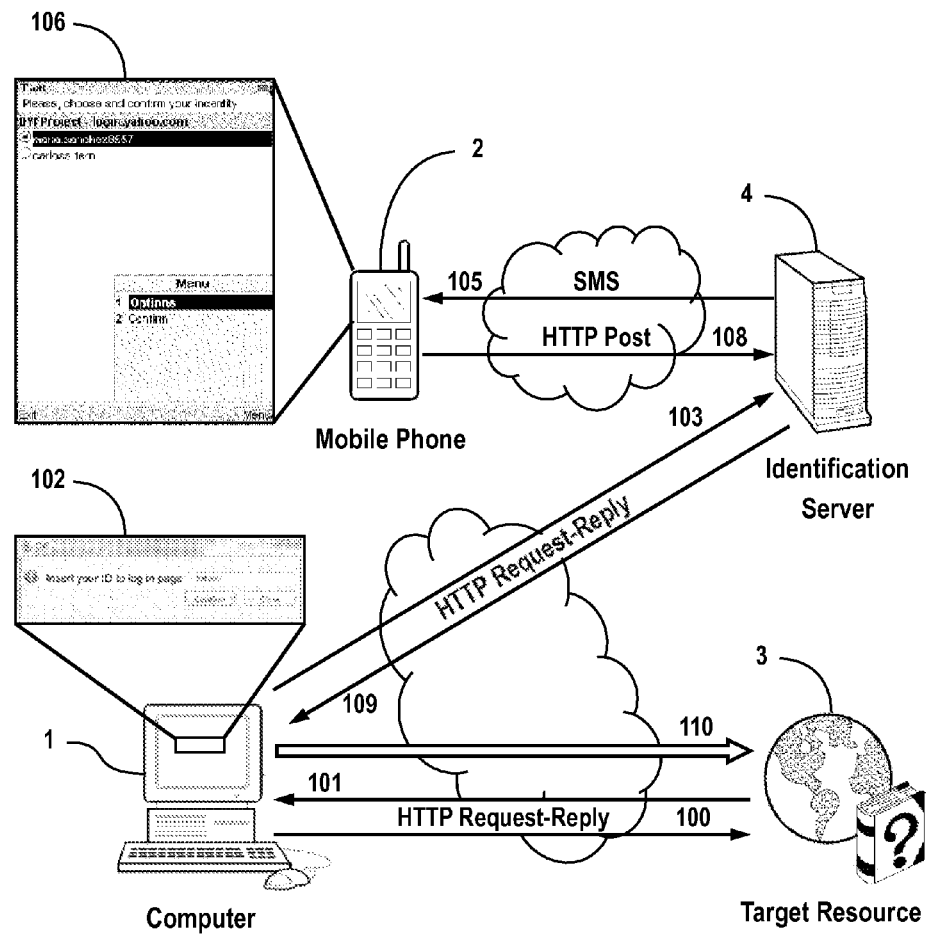

The browser plug-in 11 on the computer 1 recognizes the login form and requests (102) a user identifier (e.g. OpenID identity, user's mobile phone number, etc.) though a pop-up window, see FIG. 8. The browser plug-in 11 on the computer 1 then sends 103 an identity request (for instance, via a "HTTP GET identity [target resource, user identifier]" message) to the identification server 4 for the user private identity to log in to the target resource 3. This is a standard HTTP request carrying an identification of the target resource (the URL of the login page) and the user identifier.

With the user identifier, the identification server 4 retrieves the user's mobile phone number (usually by looking up the phone number stored in a database, since the identification server 4 is preferably part of the mobile network; in fact, the user identifier could be the phone number itself), and sends a request 105 (e.g., via an SMS: port x [target resource, user identifier]) to the user's mobile phone 2 for the user private identity required to log in to the target resource 3. This request 105 is preferably sent in the form of an SMS (on a predetermined port x) containing an identification of the target resource 3 for which a user private identity is required and a callback address (e.g. a URL).

Upon reception of the SMS (on the predetermined port x), the mobile phone detects said message on port x and runs the client application 20 (which is associated to the port x), if not running yet. The client application 20 on the user's phone pops up 106 a widget prompting the user to select a private user identity (if there are multiple options, for instance when using a plurality of email accounts with different usernames and passwords) and to confirm the automatic login to the target resource 3.

When the user has selected an identity and has confirmed that he wants to carry out the automatic login, the application client 20 on the user's phone sends 108 the particular user identity to the identification server 4 using a HTTP POST message (including the username and password of the user private identity associated to the requested target resource 3). The application client 20 can retrieve the user identities by accessing the storing device 21 (SIM or telephone memory) in which the identities are stored.

The identification server 4 forwards 109 (e.g. via "200 OK [username, password]" HTTP message) the user private identity (username and password) to the browser plug-in 11 on the computer 1. This is a standard HTTP reply to the previous request 103.

Using the user private identity received, the browser plug-in 11 automatically logs 110 into the target resource 3. This is the same mechanism standard web browsers use to support automatic login (via a "HTTP POST" message including username and password, which are contained in the particular user identity). The target resource 3 sends then the protected resource to the computer 1 (e.g. via "200 OK [protected resource]").

The SMS carries, on step 105, the callback address, i.e. the URL the client application 20 on the user's mobile phone 2 has to POST its reply to. This allows the identification server to correlate the reply (SMS) with the request (HTTP POST).

If there is no user private identity stored in the user's mobile phone 2 for a particular target resource 3, then there are two alternative implementation options:

The client application 20 on the mobile phone 2 opens a widget to ask the user for the user private identity (typically username and password) for the target resource 3 in question, stores it in the storing device 21 (e.g. the SIM card) and sends 108 it back to the identification server 4.

The client application 20 on the mobile phone 2 does not pop up a widget, but sends back a message indicating that no particular user id has been found for the target resource 3 in question. This message is forwarded to the browser plug-in 11 on the computer 1 which informs the user that automatic login is not possible, and invites the user to do a manual log-in. When the user carries out a manual log-in, the browser plug-in 11 records the user identity and sends it to the identification server 4, which in turn forwards it to the user's mobile phone 2 via SMS so that it can be stored in the SIM card (FIG. 7 does not show this scenario).

These two alternative implementation options can also be combined in a scenario where the user can enter the new user identity either on his mobile phone (through a widget on the mobile phone 2) or through the computer 1.

FIG. 8 illustrates the process for automatic login showing the elements of the system similarly to FIG. 5.

The DYI system also allows managing the Internet identities. In particular, a user should be able to add Internet identities, delete and edit them.

An important premise is that the DYI system is expected to store a user's Internet identity in his SIM card or mobile phone internal memory.

The user will be able to manage his identities in two different ways:

Directly on the mobile phone. This requires little more than a simple J2ME application on the phone that provides a widget to the Internet identities stored in the SIM or mobile phone internal memory. This first scenario is a local application on the phone and does not involve any information flows between the architecture components Via the identification server web. Since the screen and keyboard of the mobile phone 2 are sometimes too small to enter or edit data, a user may prefer to manage his or her identities via a web interface.

Figure 9:
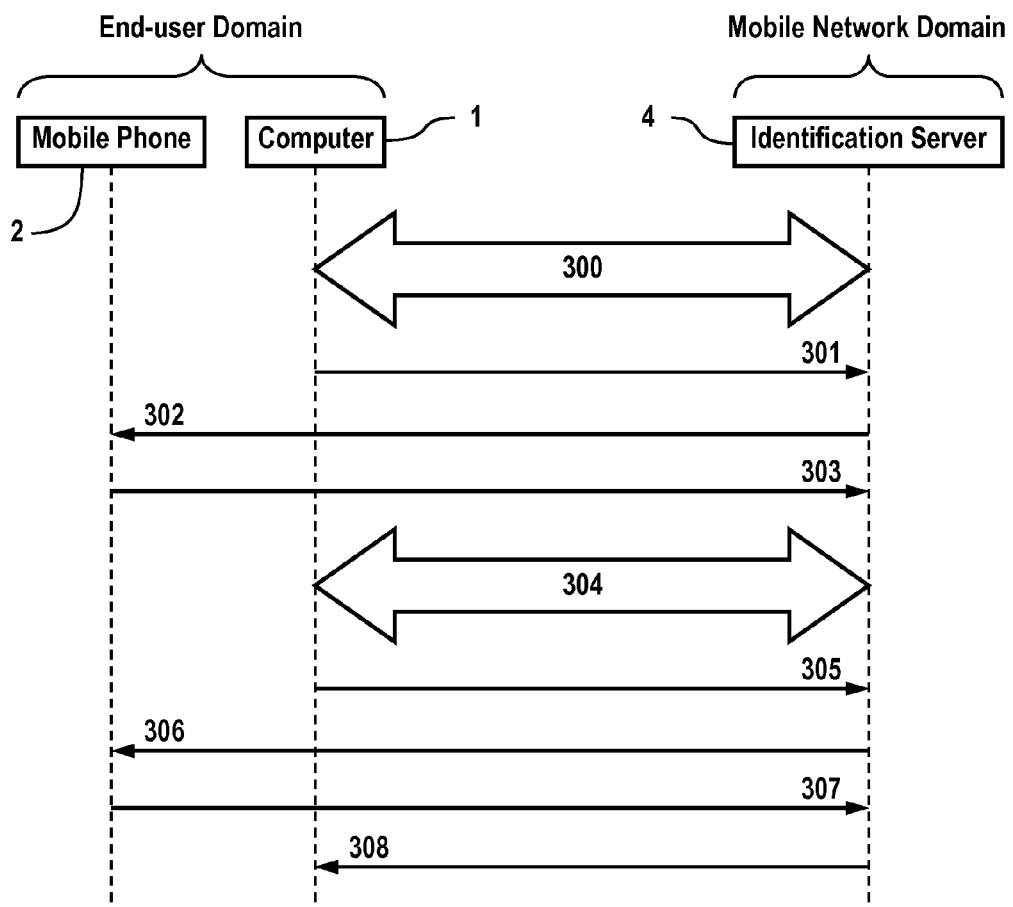
FIG. 9 depicts the flow of management of Internet identities.

Since the user's identities are stored locally in the SIM or mobile phone memory, the second scenario is not trivial and requires synchronization between the identification server web and the user's mobile phone. The user's identities may have to be temporarily stored on the identification server 4 as long as the management session lasts. FIG. 9 shows the proposed flow. Note that this flow requires login (described in previous item 1.2) prior to the proper identity management session.

The user logs 300 into the identification server 4, following the procedure described before.

The user clicks on a link to request 301 the identity management page from the server.

The identification server 4 requests 302 the user's Internet identities, stored in the user's mobile phone 2. This is essentially a synchronization action which can either be accomplished by a synchronization protocol such as SYNCML or more simply by a short message exchange.

The user's mobile phone 2 returns 303 the user's Internet identities, using the synchronization protocol or short message exchange mentioned before. The user's Internet identities will have to be encrypted for security. They are temporarily stored in the identification server 4 to allow on-line editing.

The user now edits 304 his Internet identities through a normal HTTP exchange (this may involve JavaScript or form processing).

When the user is done editing, he clicks on a button to update the identities on his mobile phone 2. This action results in a HTTP POST message being sent 305 to the identification server 4.

The identification server 4 sends 306 the updated Internet identities to the mobile phone 2, either by synchronization protocol or by short message exchange, as indicated above.

The mobile phone 2 confirms 307 the update (this is either part of the synchronization protocol, or an explicit short message)

Finally, the identification server 4 returns 308 a confirmation page to the user.

2. OpenID Based Single Sign-on

Figure 10:
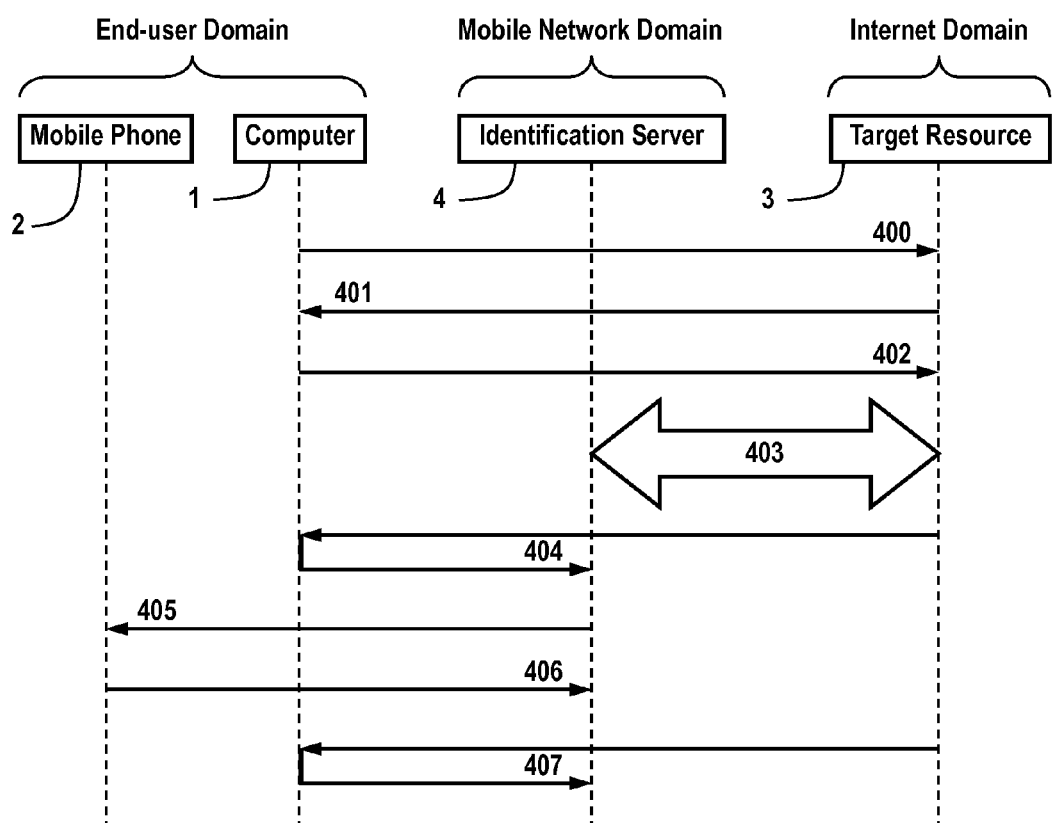
FIG. 10 shows the operation of the invention as a single sign-on system, using OpenID.

FIG. 10 shows the operation of the DYI service as single sign on system, enabling the user to log in to OpenID enabled web sites using using his OpenID. This flow conforms to the standard OpenID sign-on procedure, except for the user authentication, which in this case is done via the mobile phone.

The user accesses 400 an OpenID enabled target resource 3 (or target website, called the consumer in OpenID terminology).

The target resource 3 provides 401 a form requesting the user's OpenID identity.

The user enters his OpenID and submits 402 the form to the OpenID Consumer.

The target resource 3 sends an associate request to the identification server 4 and the two exchange 403 a shared secret using the Diffie-Hellman algorithm.

The target resource 3 redirects 404 the user to the identification server 4 for login.

The identification server 4 sends 405 a message which opens an authentication widget on the user's mobile phone and requests authentication.

The user authenticates 406 with the identification server 4 via the mobile connection.

The identification server 4 redirects 407 the user back to the target website 4, providing the necessary authentication credentials in a querystring.

All steps, except for steps 405 and 406, are standard OpenId interactions, as specified by the OpenId standard. OpenId does not impose any specific authentication mechanism, so that it is possible to authenticate a user through the mobile phone without violating the OpenId standard.

This scenario does not introduce any new requirements on websites, or on an OpenId provider. A user will be able to access any OpenId enabled website in this way without any modifications.

The invention claimed is:

1. A system comprising:
a mobile phone comprising a user input device, a storing device and a client application, the storing device having stored thereon user private identities for a user, the user private identities being associated with Internet target resources;
an identification server communicatively coupled with the mobile phone; and
a computer communicatively coupled with the identification server, the computer having a client browser with a browser plug-in, through which the Internet target resources are accessed by the user,
wherein:
(a) the browser plug-in of the computer is configured to:
detect a login form contained in information received by the client browser from one of the Internet target resources when the user is using the client browser to access the particular Internet target resource;
obtain a user identifier from the user; and
send an identity request to the identification server, the identity request comprising the user identifier obtained from the user;
(b) the identification server is configured to:
receive the user identifier sent by the computer;
determine a mobile phone number associated with the user identifier; and
send an identity message to the mobile phone, the identity message comprising an identifier of the particular Internet target resource;
(c) the client application of the mobile phone is configured to:
receive the identity message sent by the identification server;
determine if any of the user private identities stored in the storing device are associated with the particular Internet target resource; and
if at least one of the user private identities is determined to be associated with the particular Internet target resource:
obtain confirmation from the mobile phone user, using the user input device, for automatic logging in to the particular Internet target resource using one of the user private identities associated with the particular Internet target resource; and
send the confirmation and the selected user private identity to the identification server;
(d) the identification server is further configured to:
receive the confirmation for automatic logging sent by the client application of the mobile phone; and
send the selected user private identity to the client browser of the computer; and
(e) the browser plug-in is further configured to:
receive the selected user private identity from the identification server; and
log in to the particular Internet target resource using the selected user private identity.

2. The system according to claim 1,
wherein the identity request further comprises an identifier of the Internet target resource being accessed, and
wherein the browser plug-in is configured to send the identity request directly to the identification server.

3. The system according to claim 1,
wherein the Internet target resource is an OpenID enabled website, and
wherein the browser plug-in is configured to send the identity request addressed to reach the identification server through the Internet target resource.

4. The system according to claim 1, wherein if a plurality of user private identities associated with the Internet target resource are found, the client application is further configured to request the user to select one user private identity to be sent to the identification server.

5. The system according to claim 1,
wherein the client application is associated with at least one port of the mobile phone, and
wherein, upon reception of an identity message received on a predetermined port associated with the client application, the mobile phone is configured to run the client application, if the client application is not yet running.

6. The system according to claim 1, wherein each communication originating from the identification server and addressed to the mobile phone is carried out through the sending of at least one SMS message.

7. The system according to claim 1, wherein the mobile phone has wireless Internet access capability, and
wherein each communication originating from the mobile phone and addressed to the identification server is carried out through the sending of at least one HTTP message.

8. The system according to claim 1, wherein each communication between the computer and the identification server, in both directions, is carried out through at least one HTTP message.

9. A method comprising:
detecting, by a client browser of a computer, a login form sent by an Internet target resource which a user of the client browser is accessing;
requesting from the user, and accordingly obtaining, by the client browser, a user identifier;
sending an identity request, by the client browser to an identification server, the identity request comprising the user identifier;

obtaining, by the identification server upon reception of the user identifier, a mobile phone number associated with the user identifier;

sending an identity message, by the identification server to a mobile phone corresponding to the mobile phone number, the identity message comprising an identifier of the target resource;

looking up, by the mobile phone upon reception of the identity message, user private identities associated with the target resource in a storing device of the mobile phone;

if at least one associated user private identity is found,
  obtaining from the mobile phone user, using an input device of the mobile phone, a selection of one of the user private identities to be sent to the identification server if a plurality of user private identities associated with the target resource are found; and
  receiving confirmation from the mobile phone user, using the input device of the mobile phone, to automatically log in to the target resource using the one of the user private identities;

if confirmation is obtained for automatic logging, sending, by the mobile phone, the confirmation and the selected user private identity to the identification server;

if the identification server receives confirmation for automatic logging, sending, by the identification server, the selected user private identity to the client browser; and logging in, by the client browser upon reception of the selected user private identity, to the target resource using the selected user private identity.

10. The method according to claim 9, wherein each communication originating from the identification server and directed to the mobile phone is carried out through the sending of at least one SMS message.

11. The method according to claim 9, wherein each communication originating from the mobile phone and directed to the identification server is carried out through the sending of at least one HTTP message.

12. The method according to claim 9, wherein each communication between the computer and the identification server, in both directions, is carried out through at least one HTTP message.

13. The system according to claim 1, wherein each user private identity stored on the storing device of the mobile phone comprises a username and a password.

14. The system according to claim 1, wherein the storing device of the mobile phone comprises a SIM or a memory.

15. The system according to claim 1, wherein the computer is communicatively coupled with the identification server through the internet.

16. The system according to claim 1, wherein the browser plug-in is further configured to request the user identifier from the user before obtaining the user identifier from the user.

17. The system according to claim 1, wherein the user identifier and the mobile phone number are identical.

18. The system according to claim 1, wherein if two or more of the user private identities are determined to be associated with the particular target resource, the client application of the mobile phone is further configured to request that the mobile phone user select one of the user private identities associated with the particular target resource.

19. A system comprising:
a mobile phone comprising a user input device and a storing device, the storing device having stored thereon user private identities for a user, the user private identities being associated with Internet target resources; and
a computer communicatively coupled with the mobile phone,
wherein:
  (a) the computer is configured to:
    detect a login form contained in information received from one of the Internet target resources; and
    relay an identifier of the particular Internet target resource to the mobile phone;
  (b) the mobile phone is configured to:
    determine if any of the user private identities stored in the storing device are associated with the particular Internet target resource using the Internet target resource identifier; and
    if at least one of the user private identities is determined to be associated with the particular Internet target resource:
      obtain from the mobile phone user, using the user input device, a selection of one of the user private identities associated with the particular Internet target resource if more than one of the user private identities is determined to be associated with the particular Internet target resource;
      obtain confirmation from the mobile phone user, using the user input device, for automatic logging in to the particular Internet target resource using the one of the user private identities; and
      relay the one of the user private identities to the computer; and
  (c) the computer is further configured to:
    log in to the particular Internet target resource using the user private identity relayed from the mobile phone.

20. The system recited in claim 19, wherein the mobile phone comprises an electronic terminal having a SIM or U/SIM card and connectable to a mobile network.

21. The system recited in claim 19, further comprising:
an identification server communicatively coupled with the mobile phone and the computer; and wherein:
  the computer is configured to relay the Internet target resource identifier to the mobile phone through the identification server; and
  the mobile phone is configured to relay the one of the user private identities to the computer through the identification server.

22. The system recited in claim 21, wherein:
the computer is configured to obtain a user identifier from the user and send an identity request to the identification server, the identity request comprising the user identifier obtained from the user; and
the identification server is further configured to determine a mobile phone number associated with the user identifier received from the computer, the mobile phone number corresponding to the mobile phone, the Internet target resource identifier being sent to the mobile phone using the mobile phone number.

23. The system recited in claim 21, wherein:
the mobile phone is further configured to send the user confirmation and the one of the user private identities to the identification server; and
the identification server is further configured to send the one of the user private identities to the computer for logging in to the particular Internet target resource.

24. The system recited in claim 19, wherein the computer has a client browser with a browser plug-in, through which the Internet target resources are accessed by the user, the browser plug-in being the portion of the computer that is configured to detect the login form contained in the information received from the particular Internet target resource.

25. The system recited in claim 24, wherein the client browser receives the information from the particular Internet target resource when the user is using the client browser to access the particular Internet target resource.

26. A method comprising:
   detecting, by a computer, a login form contained in information received from an Internet target resource;
   relaying, by the computer, an identifier of the Internet target resource to a mobile phone, the mobile phone comprising a user input device and a storing device, the storing device having stored thereon user private identities for a user, the user private identities being associated with Internet target resources;
   determining, by the mobile phone, if any of the user private identities stored in the storing device are associated with the Internet target resource using the Internet target resource identifier; and
   if at least one of the user private identities is determined to be associated with the Internet target resource:
      obtaining a selection from the mobile phone user, using the user input device, of a single one of the user private identities associated with the Internet target resource if more than one of the user private identities is determined to be associated with the Internet target resource;
      obtaining confirmation from the mobile phone user, using the user input device of the mobile phone, for automatic logging in to the Internet target resource using the one of the user private identities;
      relaying, by the mobile phone, the one of the user private identities to the computer; and
      logging in, by the computer, to the Internet target resource using the user private identity relayed from the mobile phone.

27. The method recited in claim 26, wherein:
   relaying, by the computer, an identifier of the Internet target resource to a mobile phone comprises:
      sending, by the computer, the Internet target resource identifier to an identification server; and
      sending, by the identification server, the Internet target resource identifier to the mobile phone; and
   relaying, by the mobile phone, the one of the user private identities to the computer through the identification server comprises:
      sending, by the mobile phone, the one of the user private identities to the identification server; and
      sending, by the identification server, the one of the user private identities to the computer.

28. The method recited in claim 27, further comprising:
   obtaining, by the computer, a user identifier from the user;
   sending, by the computer, the user identifier to the identification server; and
   determining, by the identification server, a mobile phone number associated with the user identifier received from the computer, the mobile phone number corresponding to the mobile phone, the Internet target resource identifier being sent to the mobile phone by the identification server using the mobile phone number.

* * * * *